Figure 1:
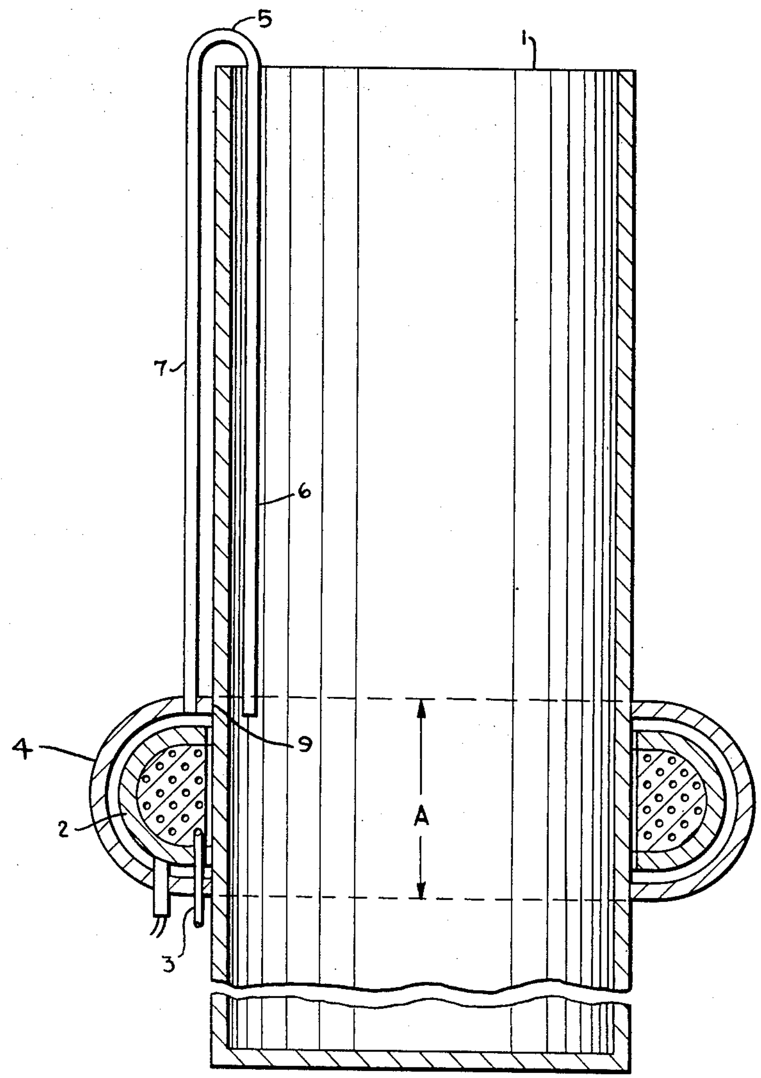

March 22, 1955 F. KOCKS 2,704,662

DEVICE FOR THE REDUCTION OF IRON OXIDES AND IRON ORES

Filed Nov. 17, 1953 2 Sheets-Sheet 2

2,704,662

DEVICE FOR THE REDUCTION OF IRON OXIDES AND IRON ORES

Friedrich Kocks, Dusseldorf, Germany

Application November 17, 1953, Serial No. 392,715

Claims priority, application Germany December 13, 1952

6 Claims. (Cl. 266—24)

This invention relates to a device for the reduction of iron oxides and particularly oxidic iron ores.

The reduction of these materials is generally carried out in the molten or in the solid state; if the reduction is performed in the molten state a molten crude iron results after the removal of the oxygen from the charge and carbonization of the iron; if carried out in the dry state a dry carbon-free iron is obtained, for instance, an iron sponge.

It is known to perform these two types of processes at a high pressure in order to accelerate the reaction and to perform the same at a possibly low temperature.

In the hitherto customary liquid or solid phase processes for the reduction of iron ores a pressure is used of, at a maximum, 3 atm. since the devices used for the performance of the reactions would not stand a higher pressure; this is the main reason why the reduction of iron ores in the liquid and in the solid phase is restricted to a well defined temperature range, which in both cases causes space limitations of the used devices.

The required reaction temperature is maintained within this limited range, whereas above and below the same charge as well as the escaping gases have an essentially lower temperature.

These working conditions lead to serious disadvantages in the reduction of iron oxides and iron ores in the solid phase, which is preferably carried out in cylindrical steel vessels particularly suited for the performance of the reduction in the gaseous state; these vessels may be positioned vertically or horizontally.

If vertical vessels or towers are used, the charge is supplied at their upper end and the reduction of the iron oxides to solid iron or iron sponge takes place in a highly heated space located at a comparatively small distance above the bottom.

The temperature required for the reduction may be produced in the vertical vessels or towers by the combustion of coal or a mixture thereof with ore; it may, however, be also generated at the outside of the vessels, for instance, by induction.

However, and independently upon the particular heating mode the temperature in the spacedly restricted reduction zone must be maintained at a height which will greatly reduce the stability and strength of the steel vessel wall surrounding the reduction zone. As a consequence thereof, comparatively low reaction pressures must be used; it has, therefore, been impossible to reduce at a high pressure of, for instance, up to 100 atm.

If these high temperatures are used the great drawback arises of the creation of deformations and bulges in the steel wall of the operating vessel, which render the operation insecure and prevent satisfactory work.

It is the main object of the invention to eliminate this severe drawback of the steel vessels generally used in the solid phase reduction of iron oxides and ores and its novel feature resides in the application of means which will create a pressure reduction in the steel vessels within the confines of the highly heated reduction zone.

Figure 2:
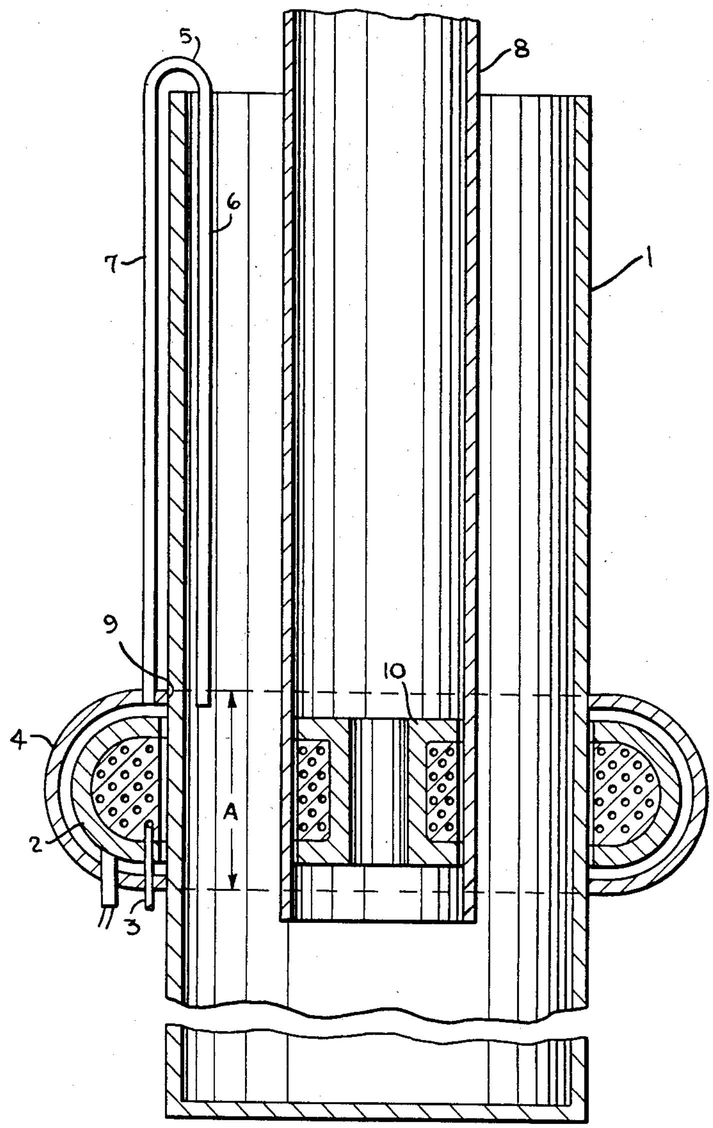

The invention will now be described more in detail and with reference to the accompanying drawing, wherein Figure 1 shows a vertical sectional view of the vessel for the reduction of the iron ores or oxides constructed in conformity with the invention, and Figure 2 shows a modification thereof.

The solid phase reduction of the iron ore takes place in the cylindrical vessel 1. The iron ore is charged in the customary manner from above and the reduction zone A located above the bottom of the vessel 1 is heated from the outside.

The necessary heat is created by the inductor 2 which is provided with water-cooling means 3.

The reducing gases, such as methane, carbon monoxide, hydrogen and mixtures thereof, generally being heated to the reduction temperature are conducted into the reduction zone A. Upon being reduced the charge sinks downwards from the reduction zone whereas the hot gases upwardly ascend through the charge and preheat the same.

A pressure reduction or pressure release is effected in zone A where, as stated above, the shape resistance of the steel is exposed at the critical reaction temperature to high pressure of more than 3 atm.

The pressure release is produced as follows:

An encasement 4, which has a substantially half-circular cross section and surrounds the vessel wall 1, is gas-tightly connected therewith, for instance, welded to its outside 9.

The pressure reduction in the highly heated reaction zone A, where the steel wall is exposed to a pressure of above 3 atm., is effected by means of the U-shaped tube 5, which reaches with its one shank 6 into the reduction zone A and with its other shank 7 into the interior space of the encasement 4, which is gas-tightly attached to the outer face 8 of the vessel wall 1.

It is apparent that by means of this device the reduction of the charge may be performed in the reduction zone at any desired pressure and even at a pressure of up to 100 atm. while any danger to the highly-heated wall of the steel vessel is eliminated.

As apparent from the above, the great technical progress resulting from the invention is based on the fact that the reduction of the iron oxides or ores in steel towers or vessels, having a high-temperature reduction zone, may be carried out at any desirable pressure, for instance, at a pressure of up to 100 atm. without danger to the work.

The cylindrical vessel 1 may be carried by supporting pillars, as also used with high furnace; however, any other support of the reaction vessel 1 may be chosen.

In conformity with the embodiment of the invention illustrated in Fig. 2, a cylindrical tube 8 is located in the vessel 1; this tube may be axially displaceable; it is used for the introduction of solid or gaseous materials. The tube reaches into the reduction zone A; a second inductor heater 10 is located in the tube 8 and within the reduction zone A.

In this manner the heating is restricted to the annular portion of the reduction zone located between tube 1 and tube 8.

As apparent from the above, the essential element of this invention is the pressure release in the high temperature reduction zone A of the steel reduction vessel 1 by the application thereto of an outer circular tight-fitting encasement 4 and the cooperation of the reduction zone with this encasement thereby enabling work at a high temperature and pressure.

Since certain changes may be made in the above device and different embodiments of the invention could be made without departing from the scope thereof, it is intended that all matter contained in the above description or shown in the accompanying drawing shall be interpreted as illustrative and not in a limiting sense.

I claim:

1. A device for the reduction of iron oxides and particularly of iron ores in the solid state comprising a cylindrical steel vessel, a reduction zone in said vessel, an encasement gas-tightly applied to the circumference of said vessel and substantially extending throughout the height of said reduction zone and pressure releasing means connecting the reduction zone with the inner space of the encasement.

2. A device for the reduction of iron oxides and particularly of iron ores in the solid state comprising a cylindrical steel vessel, a reduction zone in said vessel, an encasement gas-tightly applied to the circumference of said vessel and substantially extending throughout said reduction zone, pressure releasing means connecting the inner space of said encasement with said reduction zone and an inductor heater in said encasement to heat said pressure released reduction zone.

3. A device for the reduction of iron oxides and particularly of iron ores in the solid state comprising a cylindrical steel vessel, a reduction zone in said vessel, an encasement gas-tightly applied to the circumference of the reduction zone harbouring wall of said vessel and a tube connecting the said reduction zone with said encasement to release the pressure in said reduction zone.

4. A device for the reduction of iron oxides and particularly of iron ores in the solid state comprising a cylindrical steel vessel, a reduction zone in said vessel, an encasement of a substantially half-circular shape gas-tightly applied to the circumference of the wall portion harbouring said reduction zone, a pressure releasing tube connecting said reduction zone with the inner space of said encasement and an inductor heater in said encasement for heating said pressure released reduction zone.

5. A device for the reduction of iron oxides and particularly of iron ores in the solid state comprising a cylindrical steel vesesl, a reduction zone in said vessel, an encasement of a substantially half-circular shape gas-tightly applied to the outside of said vessel and extending substantially throughout the height of said reduction zone, pressure releasing means connecting the inner space of said encasement with said reduction zone and an inductor heater in said encasement for the heating of said reduction zone, said pressure releasing means consisting of a tube reaching with its one shank into said reduction zone and with its other shank into the inner space of said encasement.

6. A device for the reduction of iron oxides and particularly of iron ores in the solid state comprising a cylindrical steel vessel, a reduction zone in said vessel, an encasement of a substantially half-circular shape gas-tightly applied to the circumference of said vessel and extending substantially throughout the height of said reduction zone, pressure releasing means connecting the inner space of said encasement with said reduction zone, an inductor heater in said encasement for the heating of the said reduction zone, a U-shaped tube for the pressure release of said reduction zone reaching with its one shank into the same and with its other shank into said encasement, a tube centrally located in said vessel and reaching from above into said reduction zone and an induction heater located in the end portion of said tube.

References Cited in the file of this patent

UNITED STATES PATENTS

| | | |
|---|---|---|
| 390,964 | Hay | Oct. 9, 1888 |
| 428,378 | Colby | May 20, 1890 |
| 583,249 | Cowles | May 25, 1897 |
| 826,745 | Price | July 24, 1906 |
| 1,830,992 | Frenzel | Nov. 10, 1931 |
| 1,915,700 | Tama | June 27, 1938 |